July 10, 1973 L. R. DINKLER ET AL 3,745,048
BATTERY COOLING SYSTEM
Filed Dec. 30, 1970 3 Sheets-Sheet 1

INVENTORS:
LEONARD R. DINKLER,
JOHN M. EVJEN,
BY John R. Taylor
THEIR ATTORNEY.

July 10, 1973 L. R. DINKLER ET AL 3,745,048
BATTERY COOLING SYSTEM
Filed Dec. 30, 1970 3 Sheets-Sheet 1
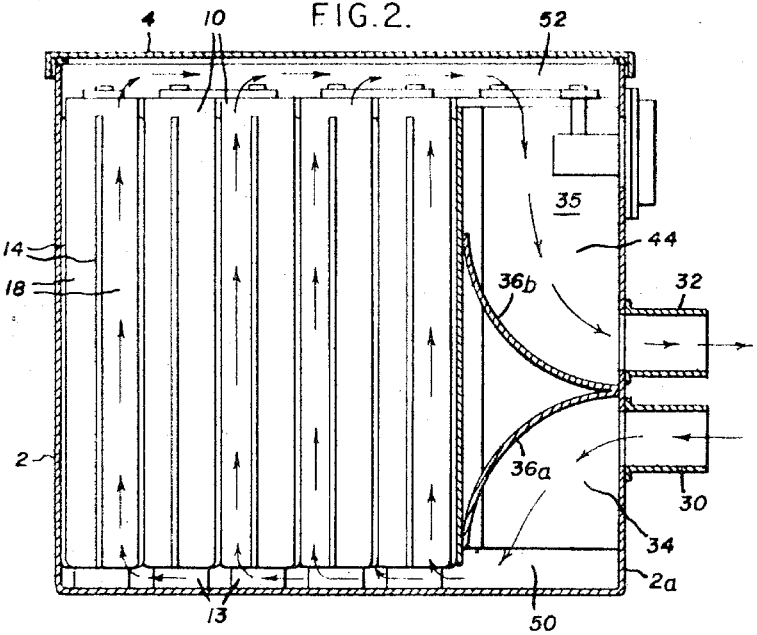
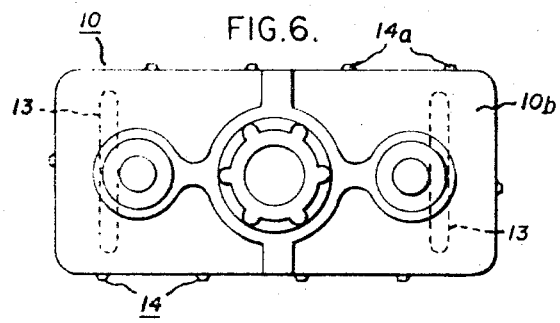
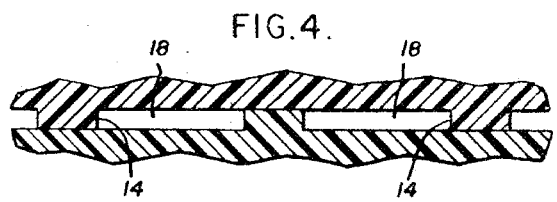
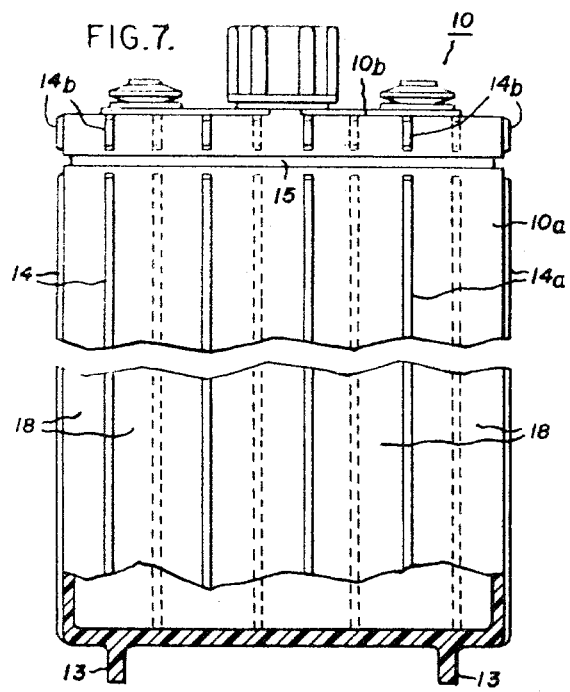
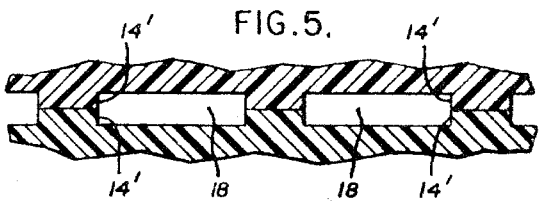
INVENTORS:
LEONARD R. DINKLER,
JOHN M. EVJEN,
BY John P. Taylor
THEIR ATTORNEY.

United States Patent Office 3,745,048
Patented July 10, 1973

3,745,048
BATTERY COOLING SYSTEM
Leonard R. Dinkler and John M. Evjen, Gainesville, Fla., assignors to General Electric Company, Owensboro, Ky.
Filed Dec. 30, 1970, Ser. No. 102,701
Int. Cl. H01m 45/02
U.S. Cl. 136—166
1 Claim

ABSTRACT OF THE DISCLOSURE

A battery cooling system is described comprising a casing and a group of cells having rib members thereon. Upper and lower plenums formed within the casing are interconnected by passageways between adjoining cells created by the ribs and cell walls to provide a uniform flow of coolant around each cell in the casing.

BACKGROUND OF THE INVENTION

This invention relates to rechargeable batteries. More particularly this invention relates to a system for removing internally generated heat generated by a rechargeable battery.

Rechargeable batteries subject to repetitive charging and discharge cycles with inadequate off-duty time often generate excessive amounts of heat due to the exothermic chemical reactions taking place within each cell during the charging or discharging period as well as the internal resistance of the cell. For example, a nickel-cadmium secondary cell generates heat during discharge. If the cell, after discharge and resultant heat generation, is subsequently charged and discharged again—before the heat generated during the first discharge has been dissipated—a heat buildup will gradually occur—which, if repeated a sufficient number of times, can result in thermal degradation of some of the materials used in construction of the cell, e.g., the separators. Excess heat may also upset the charging and overcharging characteristics of the cell.

It would therefore be advantageous to have means for carrying away excess heat generated by a rechargeable cell. When the cell is mounted into a casing with other cells to form a battery it is furthermore necessary to provide uniformity of heat dissipation since the hottest cell will determine the possible failure of the battery due to excessive heat retention.

SUMMARY OF THE INVENTION

It is therefore an object of the invention to provide a cooling system for a battery. It is another object of the invention to provide a system for the uniform removal of heat from a plurality of cells within a casing. These and other objects of the invention will be more fully understood by referring to the following description and drawings.

BRIEF DESCRIPTION OF THE DRAWINGS

FIG. 2 is a vertical cross-section view of FIG. 1 taken along lines 2—2.
FIG. 4 is an enlargement of a portion of FIG. 3.
FIG. 5 is an alternate construction of the structure illustrated in FIG. 4.
FIG. 6 is a top view of one of the cell cases illustrated in FIG. 1.
FIG. 7 is a side view of the cell case of FIG. 6.

DESCRIPTION OF THE PREFERRED EMBODIMENT

Figure 1:
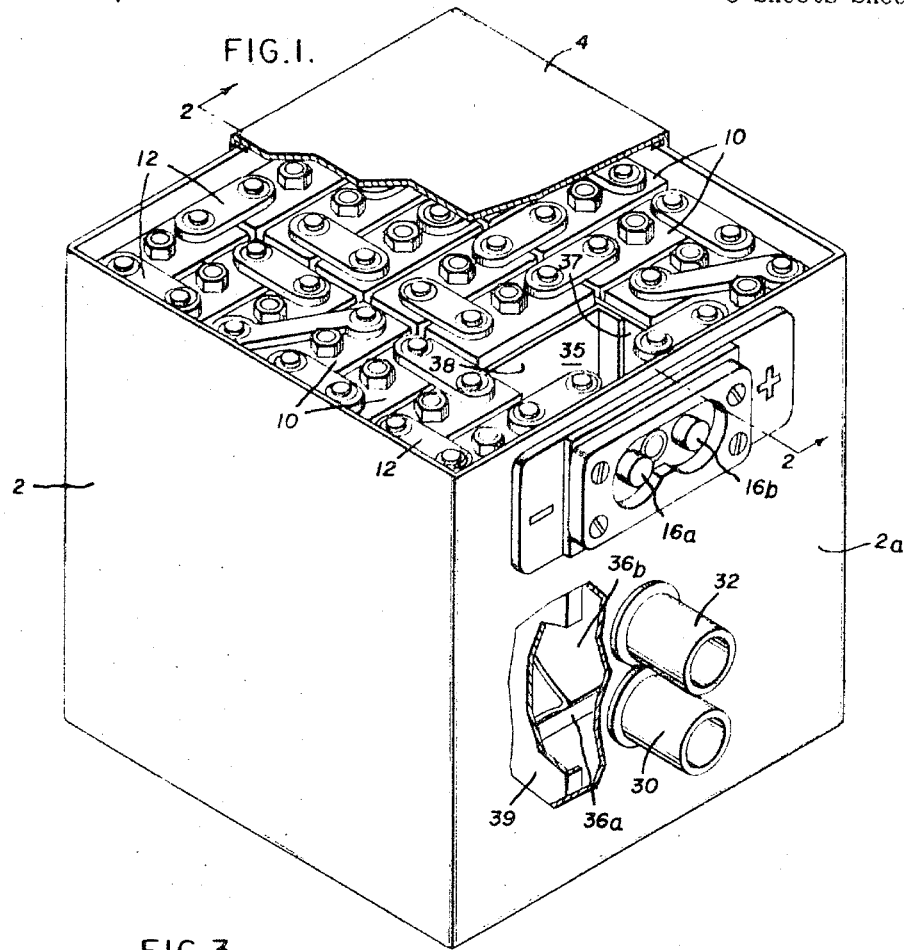
FIG. 1 is a partially broken-away isometric view of the invention.

Referring now to FIG. 1, a battery is generally shown comprising a casing 2 and a plurality of cells 10 therein. The cells are series-connected together and interconnected with battery terminals 16a and 16b via straps 12.

Casing 2 in the illustrated embodiment comprises a rectangular box having four sidewalls, a bottom wall, and a removable top wall 4 which has been partially broken away for illustrative purposes. In the preferred embodiment, top wall or cover 4 is mounted to casing 2 in sealing relationship via a gasket to provide a reasonably airtight compartment. An inlet port 30 and an outlet port 32 are provided in wall 2a to conduct a cooling medium to and from the cells as will be presently described.

Figure 3:
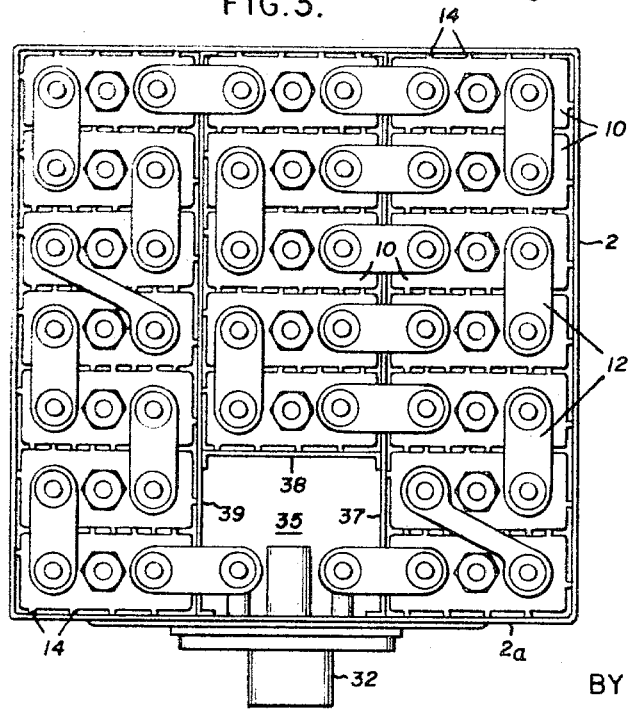
FIG. 3 is a top view of FIG. 1.

Referring now to FIGS. 3, 4, 6, and 7, a plurality of cells 10 of rectangular cross-section are mounted snugly within casing 2. As best seen in FIGS. 3, 4, and 6, preferably the walls of each cell are formed with parallel upstanding ribs 14 which space the walls of adjoining cells apart to form cavities or passageways 18. In the embodiment illustrated in FIGS. 3, 4, and 6, the ribs are positioned on each cell offset to the position of the ribs of an adjacent cell and the rib thickness then becomes the thickness of the passageway formed.

In another embodiment illustrated in FIG. 5, ribs 14' are positioned on adjacent cells to meet and form two halves of a common rib. If the width or thickness of the passageways in the embodiment illustrated in FIG. 5 are to be equal to those illustrated in FIGS. 3, 4, and 6, rib 14' must protrude out from cell 10' only half the distance that rib 14 protrudes.

Referring now to FIG. 7, each cell 10 is formed with spacers or feet 13. Spacers 13 may comprise two parallel ribs each having a length of approximately the width of cell 10. Alternatively, feet 13 may comprise a series of independent feet positioned adjacent the four corners of the bottom of cell 10. The purpose of feet 13 is to raise and space cell 10 from the floor of battery casing 2 to provide an air passageway or plenum beneath all of the cells. This plenum is in communication with the passageways 18 running vertically between the cells. Passageways 18 in turn communicate with the air space in casing 2 above cells 10 which forms a second plenum as will be described in more detail below.

Referring now to FIG. 2, the cooperation of the plenums and passageways 18 is illustrated. A coolant such as cool air is pumped into casing 2 through inlet 30 and directed to the first plenum indicated by numeral 50 by a passageway 34 which comprises a portion of a rectangularly shaped spacer member 35 formed by sidewalls 37, 38, and 39 with the sidewall of casing 2 forming the fourth wall. Member 35 is divided into two compartments or passageways 34 and 44 by curved air guides 36a and 36b. Sidewalls 37, 38, and 39 terminate a short distance from the bottom of casing 2 and thus lower compartment or passageway 34 provides communication between inlet 30 and plenum 50. Upper compartment 44, in similar fashion, provides communication between the upper plenum 52 and outlet 32. In an alternate embodiment, upper compartment 44 and outlet 32 could be replaced by openings such as louvres in cover or top wall 4.

The coolant, after entering plenum 50, is passed between each of the cells 10 through passageways 18. By dimensioning the flow cross-section of the plenums large with respect to the cross-sections of the passageways 18, a uniform pressure-drop can be created between plenum 50 and plenum 52 to insure an evenly distributed flow of the coolant through all of the passageways. In this manner uniform cooling of all of the cells can be achieved.

The coolant used preferably is air or an inert gas such as nitrogen. A liquid coolant may be used under certain circumstances if the pressure requirements are low and the cells within the battery are of the sealed type.

It should further be noted that the required pressures for air or other gaseous coolants are rather low. For example, a battery comprising an approximately 10" cuboid containing 19 Ni-Cd cells was sufficiently cooled by 25° C. air at a pressure of ½" of water to achieve a time constant reduction from 400 minutes down to 57½ minutes. The time constant is defined as the amount of time required to cool a battery to 36.8% of its initial temperature rise where the temperature rise equals the temperature of the heated battery minus the temperature of the coolant.

Turning to FIG. 7, a further advantage of the invention is illustrated. In conventional construction it is necessary to place a separator such as a piece of plastic between adjoining cells because of the slight amount of retention of the electrolyte by capillary action in the seam formed where the cover and the casing of each cell join together. Without a separator the presence of this electrolyte can create electrical leakage bridges between adjoining cells and/or between the cells and casing 2. However, the air flow in the system of the invention sweeps away or dries up any electrolyte in passages 18 which has escaped or been spilled and thus inhibits formation of electrolyte leakage bridges. Thus no additional separators are needed. There does remain the possibility that such bridges could occur in the region of ribs 14. Therefore, in accordance with a preferred embodiment of the invention, ribs 14 on cell 10 comprise two independent and interrupted portions 14a and 14b respectively on cell casing 10a and cell cover 10b. Thus, rib 14 is interrupted at seam 15 formed by cell casing 10a and cell cover 10b so that any electrolyte seeping from seam 15 will be exposed to the air flow whether the electrolyte seepage is in the vicinity of passage 18 or rib 14.

Figure 8:
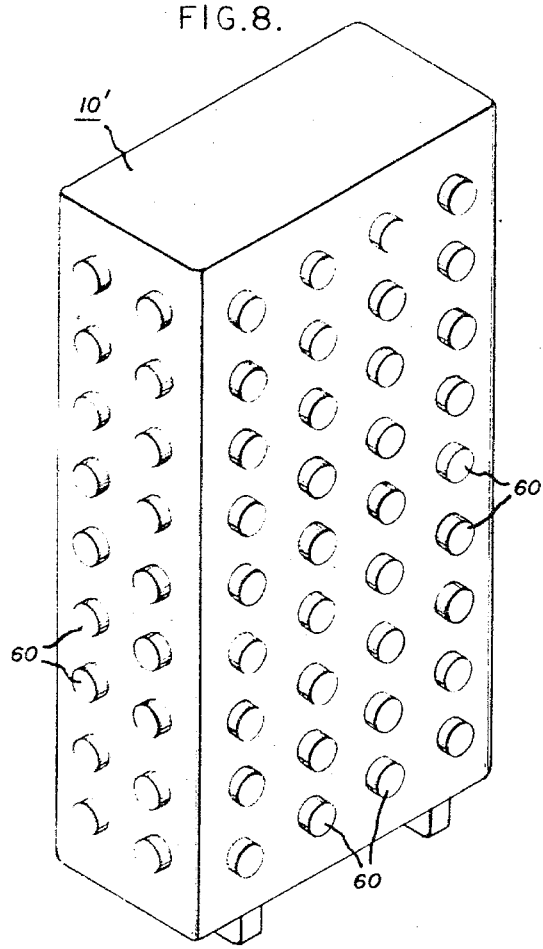
FIG. 8 is an isometric view of an alternate construction of the cell of FIG. 6.

Turning now to FIG. 8, an alternate construction of cell 10 is generally illustrated as 10' comprising a rectangular cell having a series of raised projections 60 spaced on the walls of cell 10' to space the cell from adjoining cells to thereby create air passageways between the cells. Projections 60 can be spaced to interlace with the projections of adjoining cells in similar fashion to ribs 14 in FIG. 4 or alternatively projections 60 can be spaced to intersect with the projections on adjoining cells similarly to ribs 14' in FIG. 5. In either case the thickness and the cross-sectional area of the projections should be adjusted to provide the correct total volume of the passageways created thereby to insure the pressure drop between plenums 50 and 52 thereby assuring uniform flow in all the passageways and therefore uniform cooling.

Figure 9:
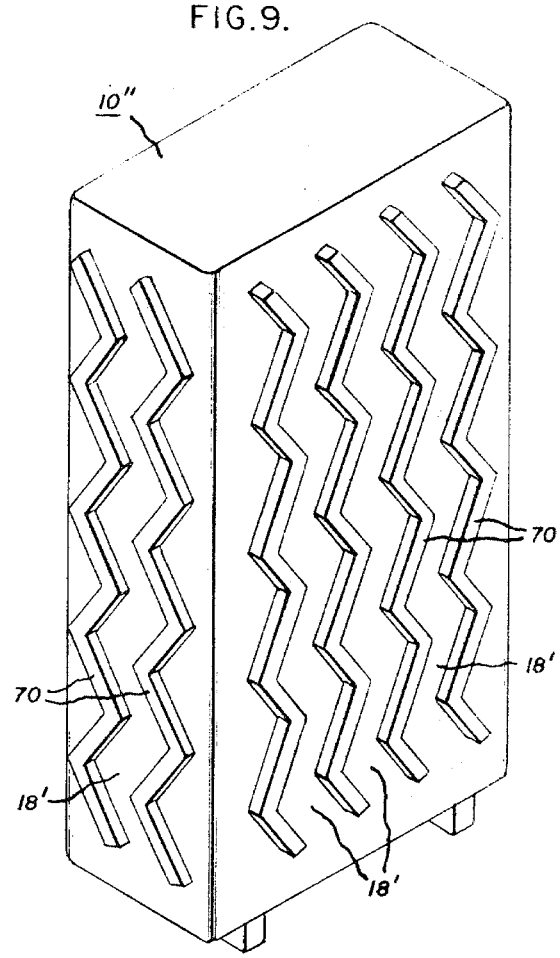
FIG. 9 is an isometric view of another alternate construction of the cell of FIG. 6.

Another construction of cell 10 is illustrated in FIG. 9 as cell 10". In this construction parallel ribs 14 have been replaced by zig-zag ribs or projections 70 which define zig-zag passageways 18' therebetween. The circuitous passageways 18' provide a longer path for the air flow which, due to its many changes in direction, has the added advantage of increasing possible turbulences in the air flow.

Thus, our invention provides a system for uniform removal of excessive heat generated by a cell during charging or discharging. Thermal degradation of the components comprising the cells is therefore prevented and the chance of battery failure considerably mitigated. Our novel battery cooling system is thus particularly useful, for example, in jet aircraft wherein conditions of repetitive use with relatively short time intervals for normal cooling are found when the aircraft is used for short trips between cities of, say, 10–30 minutes flying time. In many instances the battery is not only used to start the jet engines but also serves in the dual capacity as a back-up emergency power source for the aircraft's instruments. Battery failure in such applications is highly undesirable. Our novel cooling system provides sufficient heat removal to prevent thermal degradation and resultant battery failure while requiring only a small quantity of coolant delivered at low pressure.

What we claim as new and desire to secure by Letters Patent of the United States is:

1. A battery cooling system comprising:
   (a) a closable battery casing having an inlet and an outlet for the admission and exhaust of a coolant;
   (b) a plurality of cells in said battery casing, each of said cells further comprising a rectangular cell casing and a cell cover;
   (c) spacing means formed on the sidewalls of each of said cell casings and cell covers comprising parallel upstanding ribs offset to the position of the ribs of an adjacent cell to provide a plurality of passageways between the cells of a preselected total cross-section, said cell casings and said cell covers being joined together at a seam along said sidewalls thereof and each of said parallel upstanding ribs on said sidewalls being interrupted adjacent said seams to inhibit formation of electrical leakage bridges between adjacent cells adjacent said seams by exposing any electrolyte seeping from said seams to the flow of coolant to thereby remove said electrolyte from said passageways;
   (d) spacer means formed on the bottom of each of said cell casings to raise said cells from the bottom of said battery casing to provide a first plenum charger of preselected flow cross-section beneath the cell casings, said cells having a combined height with said spacers sufficiently less than the height of said battery casing to provide a second plenum chamber in said battery casing above said cells of preselected flow cross-section; and
   (e) means for directing the coolant from said inlet to one of said plenum chambers and for directing the coolant from the other of said plenum chambers to said outlet, said cells and said last named means comprising substantially the entire cross-sectional area of the interior of said casing; said plenum flow cross-sections being preselectively dimensioned with respect to said passageway cross-sections to create a uniform pressure drop between the plenums to insure an evenly distributed flow of coolant through all the passageways to provide uniform cooling of all of the cells.

References Cited
UNITED STATES PATENTS

| 729,550 | 6/1903 | Condict | 136—166 |
| 743,215 | 1/1956 | Great Britain | 136—166 |
| 523,837 | 12/1954 | Canada | 136—170 |
| 260,713 | 11/1926 | Great Britain | 136—166 |

FOREIGN PATENTS

| 523,837 | 12/1954 | Canada | 136—170 |
| 743,215 | 1/1956 | Great Britain | 136—166 |
| 260,713 | 11/1926 | Great Britain | 136—166 |
| 243,356 | 12/1962 | Australia | 136—166 |

DONALD L. WALTON, Primary Examiner

U.S. Cl. X.R.
136—170, 180